May 22, 1962 J. B. WIESNER 3,036,301

COMMUNICATION SYSTEMS

Filed Dec. 5, 1952

INVENTOR
JEROME B. WIESNER
BY Elmer J. Gorn
ATTORNEY

United States Patent Office 3,036,301
Patented May 22, 1962

3,036,301
COMMUNICATION SYSTEMS

Jerome B. Wiesner, Watertown, Mass., assignor to Raytheon Company, a corporation of Delaware
Filed Dec. 5, 1952, Ser. No. 324,201
12 Claims. (Cl. 343—100)

This invention relates to an anti-fading system for microwave communication and, more particularly, relates to a receiving system in which the direct rays and reflected rays from a transmitting station are separated so that the signal ultimately used in the receiver arrives substantially through but one propagation path.

An object of this invention is to provide means for more simply and economically minimizing the effect of fading due to multi-path propagation.

A further object of this invention is to provide means for reducing fading with the use of but one receiver.

Another object of this invention is to provide means for separating either the direct ray or the reflected ray from a composite transmitted signal before application to the receiver.

Complementary diversity reception is commonly used to minimize the effect of fading owing to multi-path propagation. With this system, switching between two or more receiver allows the use at any given time of the antenna which is picking up the strongest signals. When diversity reception is employed, however, the signal ultimately utilized in the receiver is the vector sum of two or more signals, arriving at the receiver through paths of different length, and thus displaced in time. Not only may selective fading result, but in F.M. systems, especially with wide-band modulation and high-frequency intelligence, the difference in time delay is troublesome since the instantaneous frequency of the various received signals is different.

In the receiving system, according to the invention, two vertically-spaced antennas are used to pick up the transmitted energy, and the outputs of the two antennas are connected through appropriate transmission lines to two branches or pairs of terminals of a hybrid network which may, for example, be either a hybrid ring, sometimes referred to as a "rat race," or a hybrid junction, such as a magic-tee. A phase shifter connected in one of the transmission lines permits a change in the electrical length of that line with respect to the other line to be effected, thereby producing a variable difference in length of the two transmission paths.

By properly adjusting the vertical spacing of the antennas and the length of transmission line between the antennas and the hybrid network, the direct rays from the transmitter produce at first and second of said branches or terminals of the hybrid network signals which are either in phase or 180 degrees out of phase, while the indirect or reflected rays produce at the aforesaid two branches of the hybrid network signals which are of opposite phase from that of the signals resulting from the direct rays. Energy will thus appear only at one of the remaining two branches or terminals, depending upon whether the phase angle between the signals applied to the first and second of said branches or terminals is zero degrees or 180 degrees. By adjusting the phase of the signals applied to the first and second of said branches to a value equal to zero, a receiver coupled to one of said remaining branches will be energized by the in-phase signals only.

Figures 1, 2, 3:
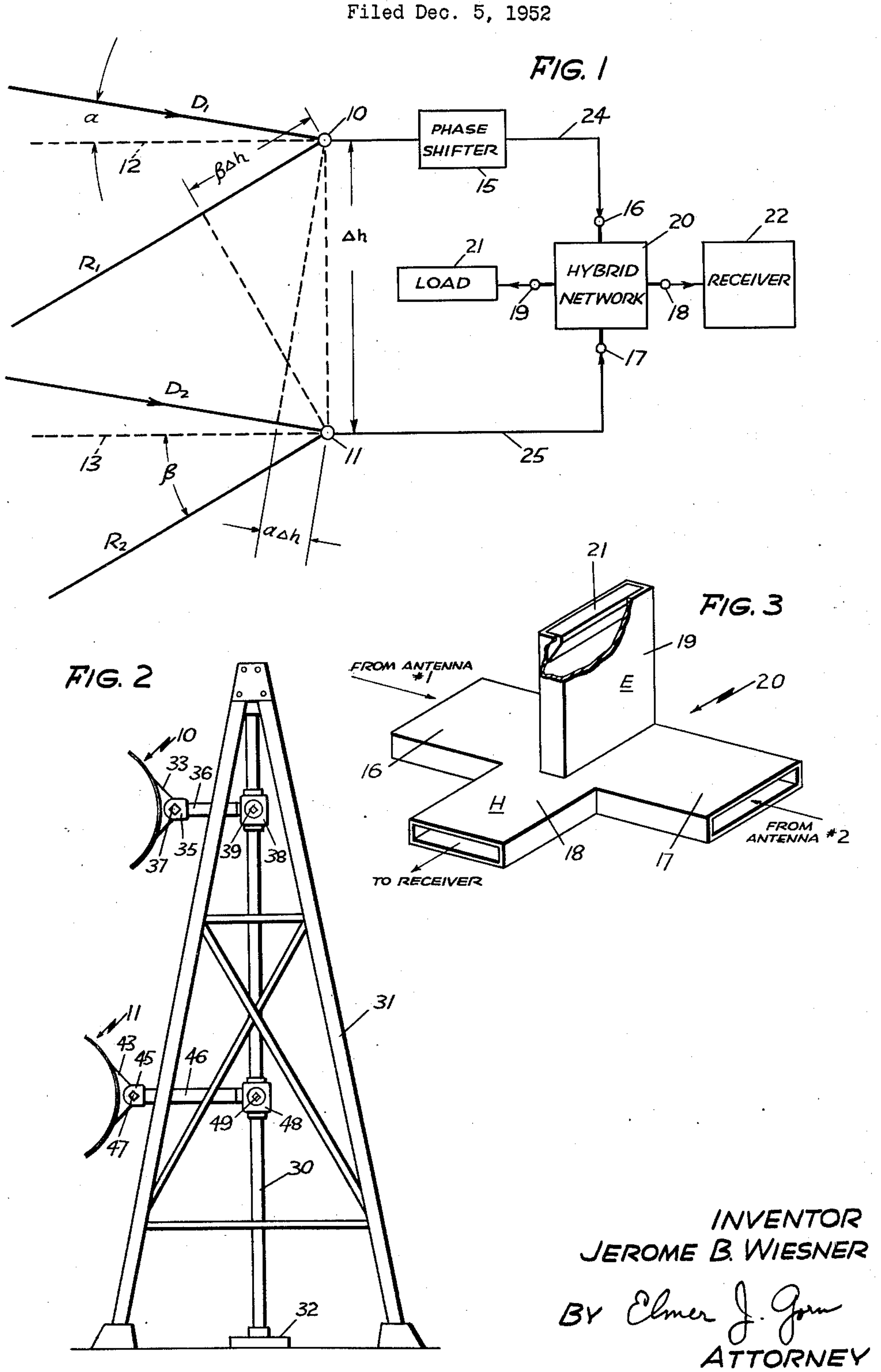
FIG. 1 is a general representation of the communication system according to the invention.
FIG. 2 shows one form of mounting means for the antennas shown in FIG. 1.
FIG. 3 is a perspective view of a magic-tee which may be used in the system shown in FIG. 1.

Referring to FIG. 1, a pair of antennas 10 and 11 is spaced vertically by an amount $\Delta h$ which may be varied in a manner to be described subsequently. These antennas may be of any type as, for example, a parabolic reflector. Antenna 10 is receptive of a direct wave $D_1$ and reflected wave $R_1$. Antenna 11 is receptive of a direct wave $D_2$ and a reflected wave $R_2$. Since the distance between the transmitter and the receiving antennas is relatively great, waves $D_1$ and $D_2$ are substantially parallel, and the path of the direct waves $D_1$ and $D_2$ is angularly displaced from the axes of maximum response 12 and 13 of antennas 10 and 11, respectively, by an amount $\alpha$. Similarly, the reflected waves $R_1$ and $R_2$ are also substantially parallel, and the path of the reflected waves $R_1$ and $R_2$ is displaced from the axes of maximum response 12 and 13 of antennas 10 and 11, respectively, by an amount $\beta$. It should be understood that, by proper tilting of antennas 10 and 11, in a manner to be shown later, angle $\alpha$ may be made equal to zero, in which case, angle $\beta$ is correspondingly changed.

Since the angles $\alpha$ and $\beta$ are very small for most practical communication links, sin $\alpha \approx \alpha$ and sin $\beta \approx \beta$. An inspection of FIG. 1 will show that direct wave $D_2$ traverses a path whose length exceeds that of direct wave $D_1$ by an amount $\alpha\Delta h$ while the reflected wave $R_1$ traverses a path exceeding in length the path traversed by reflected wave $R_2$ by an amount $\beta\Delta h$. Antennas 10 and 11 are connected through transmission lines 24 and 25, respectively, to terminals 16 and 17, respectively, of a well-known hybrid network 20 which also includes branches or terminals 18 and 19. A phase shifter 15 is inserted in line 24 for reasons which will be described hereinafter. Hybrid network 20 is characterized in that, if energy is applied to terminals 16 and 17 in phase, substantially all this energy will appear at terminal 18, whereas, if energy is fed to terminals 16 and 17 in phase opposition, substantially all of the incident energy will appear at terminal 19 and none of the energy will appear at terminal 18. An energy dissipative load 21 connected to terminal 19 serves to absorb whatever energy may appear at terminal 19 and prevents reflection of this energy into the other terminals of the hybrid network.

A receiver 22 is connected to branch or terminal 18 of the hybrid network and is adapted to receive either the direct wave signals or the reflected wave signals to the exclusion of the others.

When the phase displacement of the two signals to terminals 16 and 17 is other than zero degrees or 180 degrees, there is transmission to both terminals 18 and 19. In order to separate the direct wave signals from the reflected wave signals, it becomes necessary, therefore, to provide means for insuring that the direct wave signals applied to terminals 16 and 17 are in phase, while the reflected wave signals so applied are 180 degrees out of phase, or vice versa, depending upon which of the antenna transmission lines is longer.

Since the path length of the direct wave $D_2$ exceeds that of direct wave $D_1$ by the amount $\alpha\Delta h$, the length of line 24 must be increased by the same amount if the two waves are to arrive at terminals 16 and 17 in phase. If $\Delta l$ is the net difference in length of transmission lines 24 and 25, $$\alpha\Delta h = \Delta l \tag{1}$$

Similarly, since the path length of reflected wave $R_1$ is longer than that of the reflected wave $R_2$ by an amount $\beta\Delta h$, the length of transmission line 24 plus the difference in path lengths of the reflected waves $R_1$ and $R_2$ should differ from the length of transmission line 25 by $n\lambda/2$ where $n$ is any integer and $\lambda$ is the wave length at the operating frequency of the communication system. In other words, $$\beta\Delta h+\Delta l=\frac{\lambda}{2} \quad (2)$$

Adding Equations 1 and 2 and solving for $\Delta h$, $$\Delta h=\frac{\lambda}{2}\frac{1}{\alpha+\beta} \quad (3)$$

Substituting the value of $\Delta h$ obtained in Equation 3 in Equation 1, $\Delta l$ becomes $$\Delta l=\frac{\lambda}{2}\frac{\alpha}{\alpha+\beta} \quad (4)$$

If the antennas are positioned so that $\alpha$=zero, then $$\Delta h=\frac{\lambda}{2\beta} \quad (5)$$

and $$\Delta l=0 \quad (6)$$

When Equations 3 and 4 are satisfied, the signal at terminal or branch 18 of the hybrid network is due solely to the direct wave.

If it were desired that the receiver be responsive only to the reflected wave, phase shifter 15 would be inserted in line 25 and $\Delta h$ and $\Delta l$ would obviously be given by the following equations:

$$\Delta h=\frac{\lambda}{2}\frac{1}{\alpha+\beta} \quad (7)$$

and $$\Delta l=\frac{\lambda}{2}\frac{\beta}{\alpha+\beta} \quad (8)$$

Referring to FIG. 2, the yokes 33 and 43 of antennas 10 and 11, respectively, may be carried by a support rod 30 which, in turn, is supported at one end by supporting structure 31 and at the other end by base plate 32. The details of the antenna mounting are shown by way of illustration only, and various modifications of the adjustable antenna support may be made without departing from the scope of the invention.

The yokes 33 and 43 of antennas 10 and 11, respectively, are supported within the pronged ends 35 and 45 of bifurcated members 36 and 46 having holes therein for the insertion of a bolt or other fastening devices 37 and 47, all respectively. By loosening the nut on said bolts it is possible to tilt the antennas about a horizontal axis by the desired amount. In this way, the angle $\alpha$ may be made equal to zero degrees, if so desired. The opposite end of each of members 36 and 46 is in the form of sleeves 38 and 48, respectively, adapted to slidably fit about support rod 30. The corresponding sleeves may be held at any desired position along support rod 30 by means of one or more set screws 39 and 49 associated with said sleeves.

In FIG. 3, a particular type of hybrid network commonly known as a magic-tee is shown with arrows indicating the external connections to the various arms. Since magic-tees are well known in the art, only a brief description of the operation will be given here. Magic-tee 20 comprises arms or branches 16, 17, 18 and 19. Energy from antennas 10 and 11 is applied to arms 16 and 17, respectively. An energy dissipative load 21 is inserted within arm 19 in the usual manner to substantially prevent reflection of energy within arm 19. The receiver is connected to arm 18. Arm 19, which branches in the electric plane, that is, from the wide dimension of the main guide formed by arms 16 and 17, is effectively in series with said guide and is sometimes referred to as a series arm or E arm. Similarly, arm 18, branching from the narrow dimension of the wave guide, is effectively connected in parallel across said main guide and is referred to as a shunt arm or H arm.

If energy is fed into arms 16 and 17 in phase, all of this energy will appear in arm 18 and none will appear in arm 19. If, on the other hand, energy is fed into arms 16 and 17 in phase opposition, substantially all this energy will appear in arm 19. The magic-tee, therefore, lends itself well to the separation of either the direct or the reflected wave from a composite microwave signal.

From a knowledge of the topography and the relative heights of the transmitting and receiving antennas, a sufficiently accurate approximation of the values of $\alpha$ and $\beta$ may be obtained for determining the value of $\Delta h$. Although angles $\alpha$ and $\beta$ may be geometrically approximated as stated above, the practical procedure for satisfying Equations 3 and 4 is to separate the antennas by an amount $\Delta h$ near the value calculated from the topographical data and adjust the phase shifter 15 until maximum average signal strength is obtained at the receiver. This procedure is repeated until the fading range in db is reduced to a minimum.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A microwave communication system adapted to separate the direct wave and the reflected wave emanating from a remote source of radiant energy comprising a first antenna, a second antenna spaced from said first antenna, a hybrid network having four sets of terminals, means for connecting said first antenna to a first of said sets of terminals, means for connecting said second antenna to a second of said sets of terminals, a receiver connected to a third of said sets of terminals, and means for adjusting said antenna spacing so that energy derived from one of said waves enters said first and second sets of terminals in phase and energy derived from the other of said waves enters said first and second sets of terminals in phase opposition.

2. A microwave communication system adapted to separate the direct wave and the reflected wave emanating from a remote source of radiant energy comprising a first antenna, a second antenna spaced from said first antenna, a hybrid junction having four branches, means for connecting said first antenna to a first of said branches, means for connecting said second antenna to a second of said branches, a receiver connected to a third of said branches, and means for adjusting said antenna spacing so that energy derived from one of said waves enters said first and second branches in phase and energy derived from the other of said waves enters said first and second branches in phase opposition.

3. A microwave communication system adapted to separate the direct wave and the reflected wave emanating from a remote source of radiant energy comprising a first antenna, a second antenna vertically spaced from said first antenna by an adjustable amount, a hybrid network having four pairs of terminals, said first antenna being connected to a first of said pairs of terminals and forming a first conductive path, a variable phase shifter interconnecting said second antenna and a second of said pairs of terminals and forming a second conductive path, said phase shifter being adapted to vary the electrical length of said second conductive path, an energy-dissipative load connected to a third of said pairs of terminals, a receiver connected to a fourth of said pairs of terminals, and means for adjusting said antenna spacing and said phase shifter to permit the transfer of energy from said source to said fourth pair of terminals and to prevent the transfer of energy from said source to said third pair of terminals.

4. A microwave communication system adapted to separate the direct wave and the reflected wave emanating from a remote source of radiant energy comprising a first antenna, a second antenna vertically spaced from said first antenna by an adjustable amount, a hybrid junction having four branches, said first antenna being connected to a first of said branches and forming a first conductive path, a variable phase shifter interconnecting said second antenna and a second of said branches and forming a second conductive path, said phase shifter being adapted to vary the electrical length of said second conductive path, an energy-dissipative load connected to a third of said branches, a receiver connected to a fourth of said branches, and means for adjusting said antenna spacing and said phase shifter to permit the transfer of energy to said fourth branch and to prevent the transfer of energy to said third branch.

5. A microwave communication system adapted to separate the direct wave and the reflected wave from a remote source of radiant energy comprising a first antenna, a second antenna vertically spaced from said first antenna, a first transmission line, a second transmission line, a magic-tee having first and second collinearly-arranged arms, a series arm and a parallel arm all connected to a common junction, a phase shifter, said first transmission line interconnecting said first antenna and said first arm, said second transmission line interconnecting said second antenna and said second arm and including said phase shifter, and a receiver coupled to said parallel arm, said phase shifter and said antenna spacing being adjustable to effect an output at said parallel arm which is due solely to said direct wave.

6. A microwave communication system adapted to separate the direct wave and the reflected wave emanating from a remote source of radiant energy comprising a first antenna, a second antenna vertically spaced from said first antenna by an adjustable amount $\Delta h$, said antennas being positioned so that the direct wave impinges upon said antennas at an angle $\alpha$ with respect to the axis of maximum response of said antennas and the reflected wave impinges upon said antennas at an angle $\beta$ with respect to the axis of maximum response of said antennas, a hybrid junction having four branches, means for connecting said first antenna to a first of said branches, means for connecting said second antenna to a second of said branches, an energy-absorbing load connected to a third of said branches, and a receiver connected to a fourth of said branches, said antenna spacing being adjusted so that $\beta\Delta h$ is equal to $n\lambda/2$ where $n$ is an integer and $\lambda$ is the wave length at the operating frequency, whereby said receiver is energized only by said direct wave.

7. A microwave communication system adapted to separate the direct wave and the reflected wave emanating from a remote source of radiant energy comprising a first antenna, a second antenna vertically spaced from said first antenna by an adjustable amount $\Delta h$, said antennas being positioned so that the direct wave impinges upon said antennas at an angle $\alpha$ with respect to the axis of maximum response of said antennas and the reflected wave impinges upon said antennas at an angle $\beta=0$ with respect to the axis of maximum response of said antennas, a hybrid junction having four branches, means for connecting said first antenna to a first of said branches, means for connecting said second antenna to a second of said branches, an energy-absorbing load connected to a third of said branches, and a receiver connected to a fourth of said branches, means for adjusting said antenna spacing so that $\alpha\Delta h$ is equal to $n\lambda/2$ where $n$ is an integer and $\lambda$ is the wave length at the operating frequency, whereby said receiver is energized only by said reflected wave.

8. A microwave communication system adapted to separate the direct wave and the reflected wave from a remote source of radiant energy comprising a first antenna receptive of said direct wave and said reflected wave, a second antenna receptive of said direct wave and said reflected wave and spaced from said first antenna by an amount $\Delta h$, said direct wave impinging upon said antennas at an angle $\alpha$ with respect to the axis of maximum response of said antennas and said reflected waves impinging upon said antennas at an angle $\beta$ with respect to the axis of maximum response of said antennas, a hybrid junction having four branches two of which are symmetrical, first means interconnecting said first antenna to one of said symmetrical branches, second means interconnecting said second antenna to the other of said symmetrical branches, an energy-absorbing load connected to a third of said branches, a receiver connected to a fourth of said branches, one of said means including a variable phase shifter adapted to effect a net difference between the electrical lengths of said first and second means equal to $\Delta l$, and means for adjusting said antennas and said phase shifter so that the ratio of $\Delta l$ to $\Delta h$ is equal to the angle at which the desired wave impinges upon said antennas.

9. A microwave communication system adapted to separate the direct wave and the reflected wave emanating from a remote source of radiant energy comprising a first antenna, a second antenna vertically spaced from said first antenna by an adjustable amount $\Delta h$, said direct wave and said reflected wave impinging upon said antennas at angles $\alpha$ and $\beta$, respectively, with respect to the axis of maximum response of said antennas, a hybrid junction having four branches, means for connecting said first antenna to a first of said branches and forming a first conductive path, a variable phase shifter, means for connecting said second antenna to a second of said branches and forming a second conductive path, said phase shifter being positioned in said second conductive path and adapted to effect a net difference between the electrical lengths of said first and second conductive paths equal to $\Delta l$, an energy-absorbing load connected to a third of said branches, and a receiver connected to the fourth of said branches, said antenna spacing and said phase shifter being adjusted so that $$\Delta h=\frac{\lambda}{2}\frac{1}{\alpha+\beta}$$

and $$\Delta l=\frac{\lambda}{2}\frac{\alpha}{\alpha+\beta}$$

where $\lambda$ is the wave length at the operating frequency, whereby said receiver is energized only by said direct wave.

10. A microwave communication system adapted to separate the direct wave and the reflected wave emanating from a remote source of radiant energy comprising a first antenna, a second antenna vertically spaced from said first antenna by an adjustable amount $\Delta h$, said direct wave and said reflected wave impinging upon said antennas at angles $\alpha$ and $\beta$, respectively, with respect to the axis of maximum response of said antennas, a hybrid junction having four branches, means for connecting said first antenna to a first of said branches and forming a first conductive path, a variable phase shifter, means for connecting said second antenna to a second of said branches and forming a second conductive path, said phase shifter being positioned in said second conductive path and adapted to effect a net difference between the electrical lengths of said first and second conductive paths equal to $\Delta l$, an energy-absorbing load connected to a third of said branches, and a receiver connected to the fourth of said branches, said antenna spacing and said phase shifter being adjusted so that $$\Delta h=\frac{\lambda}{2}\frac{1}{\alpha+\beta}$$

and $$\Delta l=\frac{\lambda}{2}\frac{\beta}{\alpha+\beta}$$

where $\lambda$ is the wave length at the operating frequency, whereby said receiver is energized only by said reflected wave.

11. A microwave communication system adapted to separate the direct wave and the reflected wave emanating from a remote source of radiant energy comprising a first antenna receptive of said direct wave and said reflected wave, a second antenna receptive of said direct wave and said reflected wave and spaced from said first antenna by an amount $\Delta h$, said direct wave impinging upon said antennas at an angle $\alpha$ with respect to the axis of maximum response of said antennas, the path of said direct wave to said second antenna being greater in length than the path to said first antenna by an amount $\alpha\Delta h$, said reflected wave impinging upon said antennas at an angle $\beta$ with respect to the axis of maximum response of said antennas, said reflected wave traversing a path to said first antenna which exceeds in length the path to said second antenna by an amount $\beta\Delta h$, a hybrid network having four branches and characterized in that energy fed into the first and second of said branches in phase is transferred only to the third of said branches and energy fed into the first and second of said branches in phase opposition is transferred only to the fourth of said branches, a first transmission path including said first antenna, a phase shifter and said first branch, a second transmission path including said second antenna and said second branch, a receiver connected to said third branch, said phase shifter being adapted to vary the net difference in length $\Delta l$ between said first and said second transmission paths, and means for adjusting said phase shifter and the spacing of said antennas so that $$\Delta l=\alpha\Delta h$$

and $$\beta\Delta h+\Delta l=\frac{\lambda}{2}$$

where $\lambda$ is the wave length corresponding to the operating frequency.

12. A microwave communication system adapted to separate the reflected wave and the direct wave emanating from a remote source of radiant energy comprising a first antenna receptive of said direct wave and said reflected wave, a second antenna receptive of said direct wave and said reflected wave and spaced from said first antenna by an amount $\Delta h$, said direct wave impinging upon said antennas at an angle $\alpha$ with respect to the axis of maximum response of said antennas, the path of said direct wave to said second antenna being greater in length than the path to said first antenna by an amount $\alpha\Delta h$, said reflected wave impinging upon said antennas at an angle $\beta$ with respect to the axis of maximum response of said antennas, said reflected wave traversing a path to said first antenna which exceeds in length the path to said second antenna by an amount $\beta\Delta h$, a hybrid network having four branches and characterized in that energy fed into the first and second of said branches in phase is transferred only to the third of said branches and energy fed into the first and second of said branches in phase opposition is transferred only to the third of said branches, a first transmission path including said first antenna, a phase shifter and said first branch, a second transmission path including said second antenna and said second branch, a receiver connected to said third branch, said phase shifter being adapted to vary the net difference in length $\Delta l$ between said first and said second transmission paths, and means for adjusting said phase shifter and the spacing of said antennas so that $\Delta l=\beta\Delta h$ and $$\alpha\Delta h+\Delta l=\frac{\lambda}{2}$$

where $\lambda$ is the wave length corresponding to the operating frequency.

References Cited in the file of this patent

UNITED STATES PATENTS

| | | |
|---|---|---|
| 2,310,692 | Hansell | Feb. 9, 1943 |
| 2,619,635 | Chait | Nov. 25, 1952 |

OTHER REFERENCES

Weinberger: Abstract of application No. 29,699, published February 26, 1952, 655 O.G. 1176.